D. C. SHAW & J. F. McGILLIVRAY.
SHOCK ABSORBER.
APPLICATION FILED JAN. 31, 1914.
1,097,194.
Patented May 19, 1914.
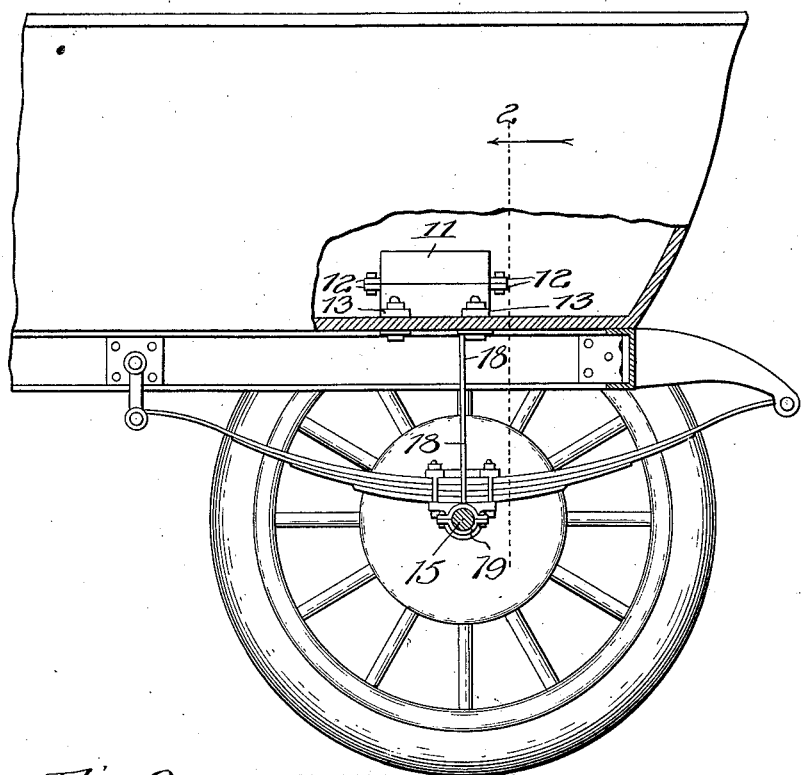
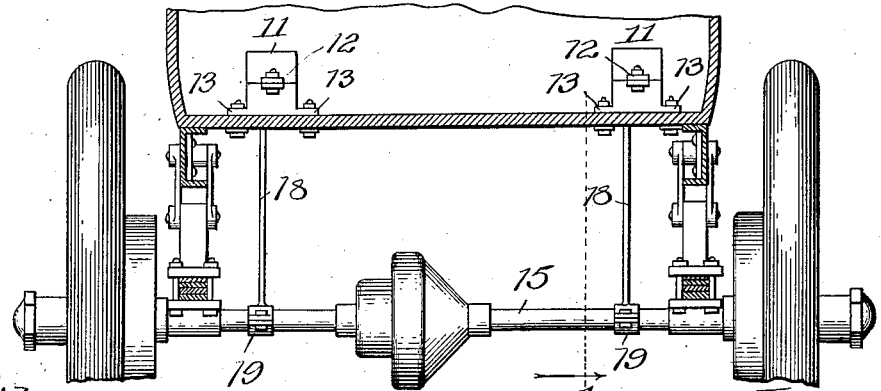

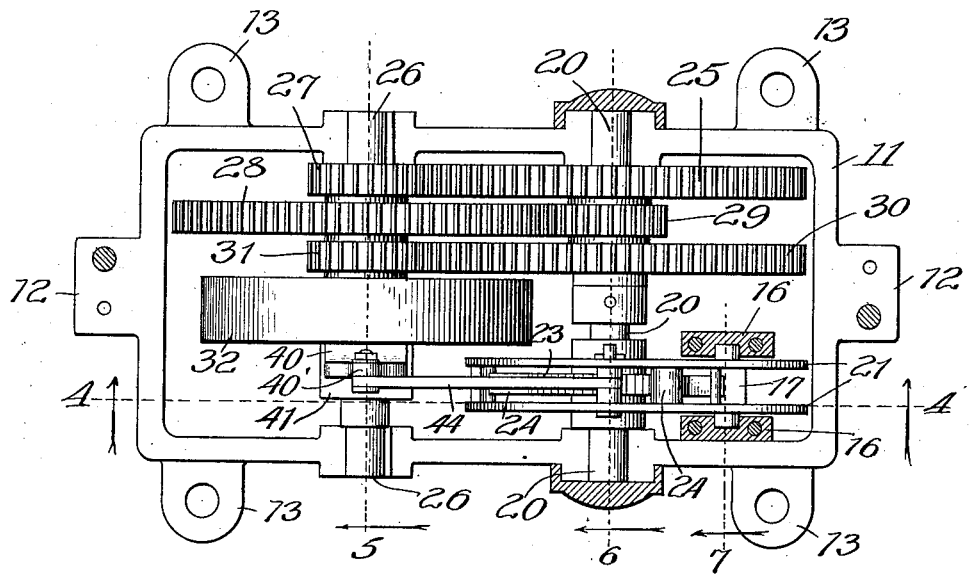
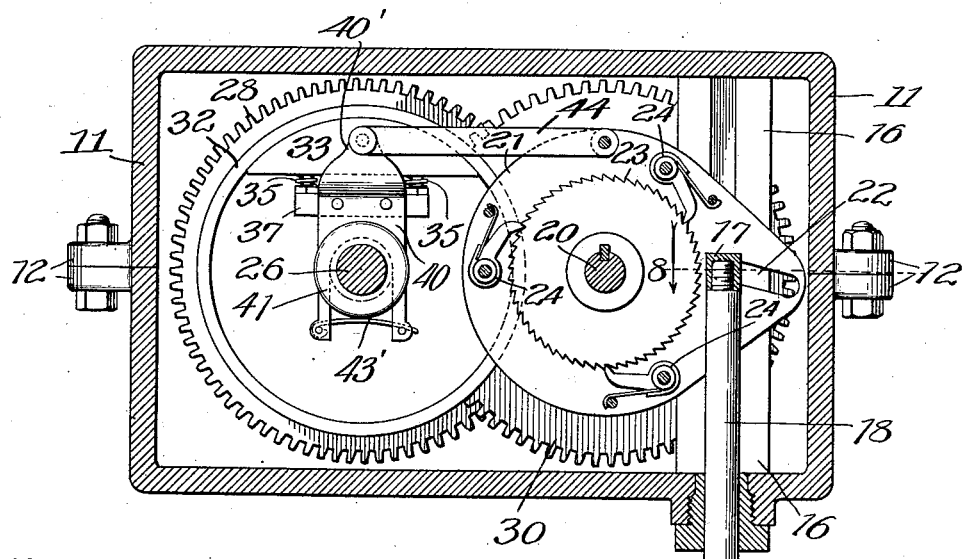

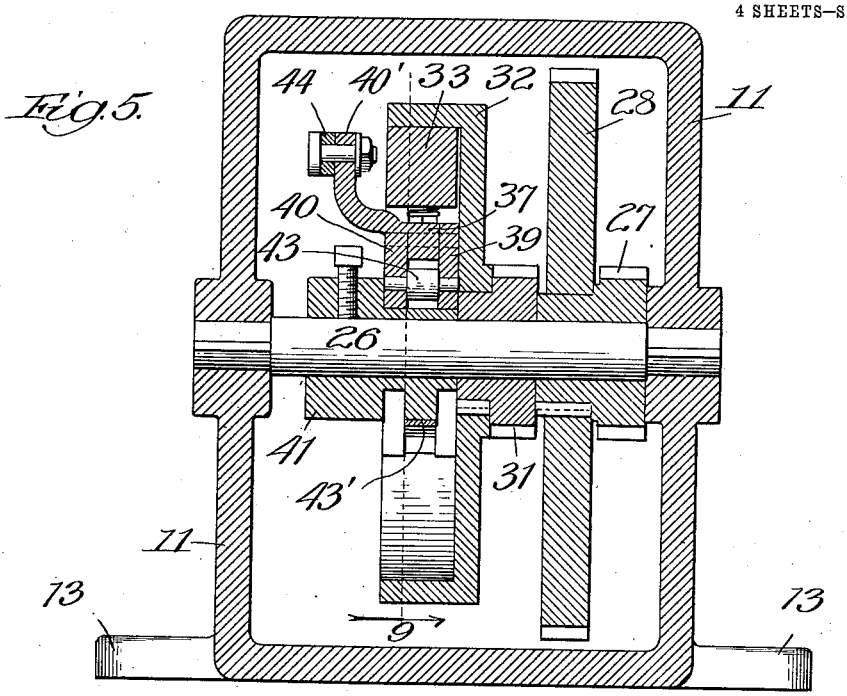
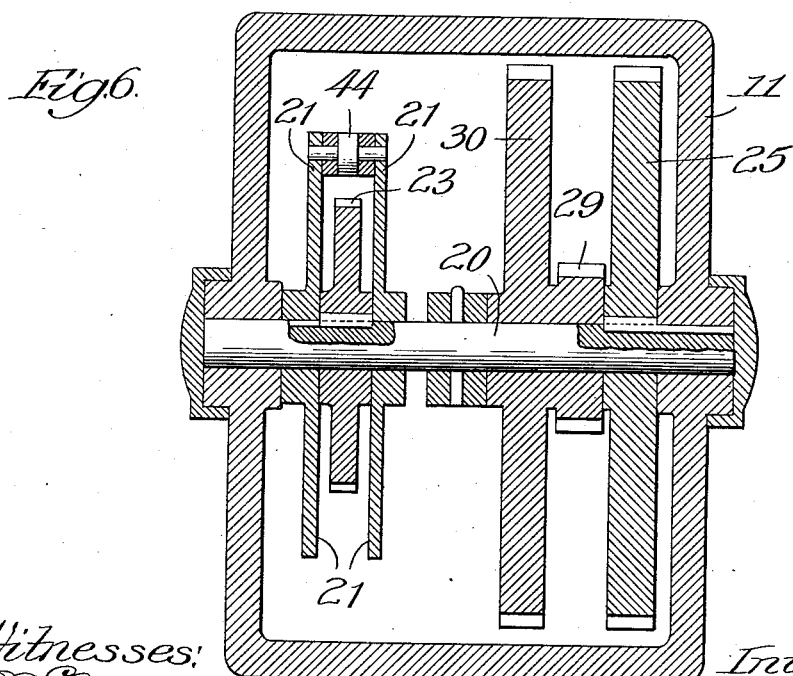

D. C. SHAW & J. F. McGILLIVRAY.
SHOCK ABSORBER.
APPLICATION FILED JAN. 31, 1914.
1,097,194.
Patented May 19, 1914.
4 SHEETS—SHEET 4.
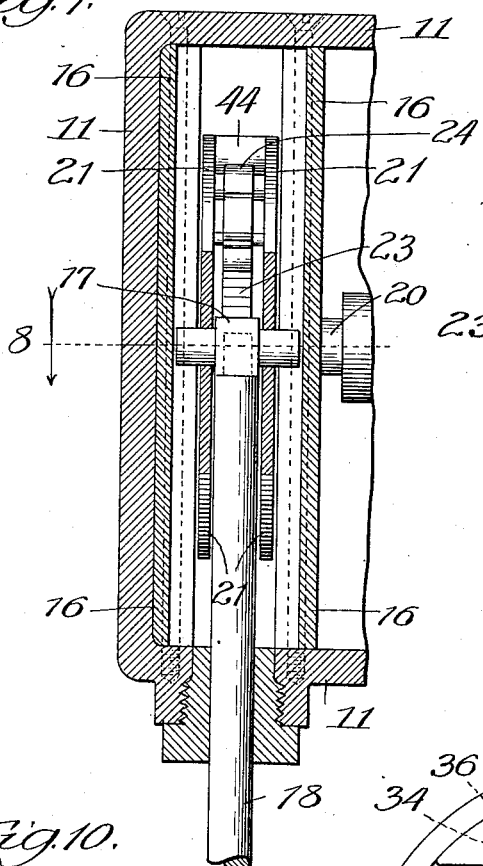
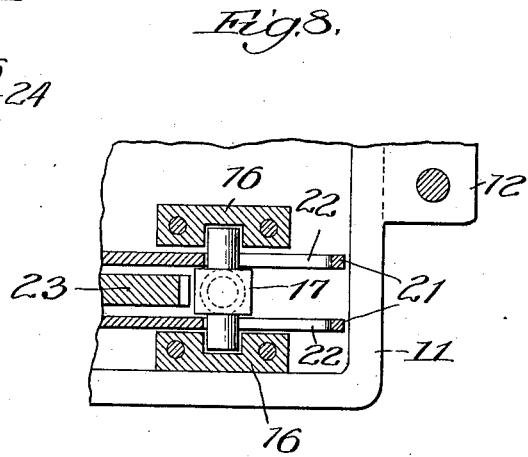
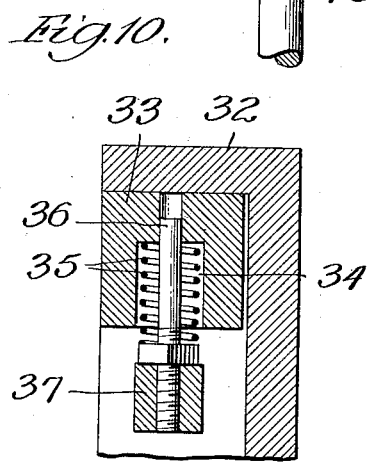
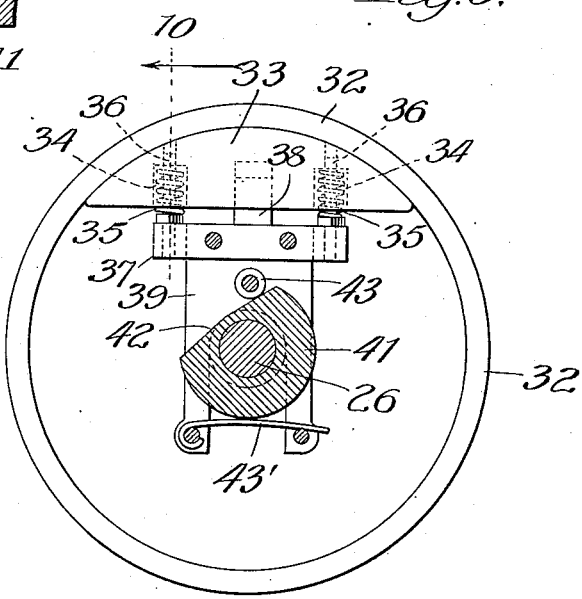
Witnesses:
Inventors:
David C. Shaw
James F. McGillivray
By Dyrenforth, Lee, Chritton & Wiles,
Attys.

UNITED STATES PATENT OFFICE.

DAVID C. SHAW AND JAMES F. McGILLIVRAY, OF SOUTH CHICAGO, ILLINOIS.

SHOCK-ABSORBER.

1,097,194.  Specification of Letters Patent.  Patented May 19, 1914.

Application filed January 31, 1914. Serial No. 815,764.

*To all whom it may concern:*

Be it known that we, DAVID C. SHAW and JAMES F. McGILLIVRAY, citizens of the United States, residing at South Chicago, in the county of Cook and State of Illinois, have invented a new and useful Improvement in Shock-Absorbers, of which the following is a specification.

Our invention relates to an improvement in shock-absorbers, which we have more especially devised for use on automobiles.

In the accompanying drawings, Figure 1 is a broken view in sectional side elevation, showing the shock-absorber as applied to an automobile, the parts shown in section being indicated as on line 1, Fig. 2; Fig. 2 is a broken section on line 2, Fig. 1; Fig. 3 is a plan view, with parts in section and with one-half of the casing removed, showing our improved mechanism; Fig. 4 is a view in sectional elevation, the section being taken on the line 4—4, Fig. 3; Figs. 5 and 6 are enlarged sections respectively on the lines 5 and 6, Fig. 3; Fig. 7 is an enlarged broken section on line 7, Fig. 3; Fig. 8 is a section on line 8, Figs. 4 and 7; Fig. 9 is a section on line 9, Fig. 5, and Fig. 10 is an enlarged section on line 10, Fig. 9.

The shock-absorber mechanism is contained in a casing 11, shown to be formed of two generally rectangular parts having end-ears 12 through which they are bolted together, the lower part being provided with laterally extending feet 13, through which to bolt the casing to the floor of the vehicle. Two of the shock-absorbers are required, one for each side of an automobile; and the most suitable position for them on the floor is under the rear seat near opposite ends thereof and directly over the rear axle 15. In the casing, near one end, are secured opposite vertical guides 16, 16 for the trunnioned ends of a cross-head 17 on the upper end of a vertical rod 18 working through the bottom of the casing and fastened by a collar 19 on its lower end to the axle 15. A shaft 20 is journaled in the opposite casing-sides and carries a pair of disk-like heads 21, 21 provided with the tapered extensions shown of the head in Fig. 4, and containing opposite inclined slots 22 in which the trunnions of the cross-head 17 are guidingly confined. Between these heads is keyed to the shaft a ratchet 23, and they carry spring-pressed pawls 24, of which three are shown, engaging the ratchet. On the shaft 20, which is shown to have caps over its ends, is secured near one end thereof, to rotate with it, a gear-wheel 25. Another shaft 26, keyed at its ends against rotation in bearings in opposite sides of the casing carries loosely a pinion 27 connected with a gear-wheel 28, which meshes with a pinion 29 loose upon the shaft 20 and connected with a loose gear-wheel 30 thereon, which in turn meshes with a loose pinion 31 on the shaft 26. The arrangement of the gearing shown is such as to cause one revolution of the wheel 25 to rotate the pinion 31 about sixteen times. On the last-named pinion is carried an open-faced circular housing 32 containing a segment-shaped brake-shoe 33 yieldingly supported at sockets 34 on springs 35 about pins 36 rising into the sockets from the opposite ends of a bar or head 37, from which a central stud 38 is shown in Fig. 9 to enter a corresponding socket in the shoe to take strain off the pins 36. The head 37 is secured between the members 39 and 40 of a double yoke, which straddle at their legs a circumferentially-grooved collar 41 secured on the stationary shaft 26 to extend within the housing 32. This collar is provided with a cam-face 42 (Fig. 9), with which engages a roller 43 journaled between the yoke-members and held in contact with the cam-face by springs 43' on the inner ends of the yoke-legs. The yoke-member 40 is provided on its upper or outer end with a curved stem 40'; and a link 44 connects this stem with the heads near their upper edges.

In the use of our device on an automobile, when an obstruction in the road is encountered, in clearing the obstruction it raises a rear wheel. The rod 18 will therefore rise (to a height depending on that of the obstruction, the limit of the rise being determined by the length of the slots 22) and turn the heads on the shaft 20, the pawls 24 then slipping over the teeth of the ratchet 23. When the wheel clears the obstruction, in dropping the rod 18 descends and turns the heads in the opposite direction, and thereby, through the link-connection 44, turns the yoke-device to ride the roller 43 into a position on the cam-face 42 to force the shoe 33 against the inner surface of the flange of the housing 32. The heads, in thus turning, engage the pawls with the ratchet to turn the shaft 20 and, by correspondingly driving the wheel 25, cause the gearing to rotate the housing a plurality of times frictionally against the brake-shoe. This prevents the springs on the vehicle from rebounding the body thereof by causing them to expand gradually and easily in the downward direction, whereby the shock of encountering and clearing the obstruction is absorbed.

As will be seen, the higher the rise of the rod 18, and therefore, the greater its extent of descent, the greater will be the extent of turning the yoke-device and the force of frictional contact between the shoe 33 and housing-surface to resist the rebounding tendency of the springs.

Realizing that considerable variation is possible in the details of construction thus specifically shown and described, we do not intend by illustrating a single, specific preferred embodiment of our invention to be limited thereto; our intention being in the following claims to claim protection upon all the novelty there may be in our invention as broadly as the state of the art will permit.

What we claim as new and desire to secure by Letters Patent is:—

1. In a shock-absorber, the combination with a casing, of a rod for connection with a vehicle-axle to work up and down with movements thereof, brake-mechanism including a housing rotatably supported in the casing, a cam-actuated brake-shoe for frictionally engaging with the housing, and connections, including gearing, between the brake-mechanism and rod, actuated by downward movement of the rod to rotate the housing against the brake-shoe.

2. In a shock-absorber, the combination with a casing, of a rod for connection with a vehicle-axle to work up and down with movements thereof, brake-mechanism comprising a cam in the casing, a housing supported in the casing to be rotated about the cam, a yoke-device carrying a roller held in engagement with the cam, a brake-shoe supported on the yoke-device to be engaged frictionally with the housing, and connections, including gearing, between the brake-mechanism and rod, actuated by downward movement of the rod to rotate the housing against the brake-shoe.

3. In a shock-absorber, the combination with a casing, of a rod for connection with a vehicle-axle to work up and down with movements thereof, brake-mechanism comprising a cam in the casing, a housing supported in the casing to be rotated about the cam, a yoke-device carrying a roller yieldingly held in engagement with the cam, a brake-shoe spring-supported on the yoke-device to be engaged frictionally with the housing, and connections, including gearing, between the brake-mechanism and rod, actuated by downward movement of the rod to rotate the housing against the brake-shoe.

4. In a shock-absorber, the combination with a casing, of a rod for connection with a vehicle-axle to work up and down with movements thereof, a shaft in the casing, brake-mechanism comprising a collar secured on the shaft and provided with a cam-face, a housing supported on the shaft to be rotated about the collar, yoke-members straddling the collar and carrying a roller spring-held in engagement with said cam-face, a brake-shoe spring-supported on a bar secured to said yoke-members to be engaged frictionally with the housing, and connections, including gearing, between the brake-mechanism and rod, actuated by downward movement of the rod to rotate the housing against the brake-shoe.

5. In a shock-absorber, the combination of a casing, a rod for connection with a vehicle-axle to work up and down with movements thereof, a shaft journaled in the casing, carrying to rotate with it a ratchet and, loosely, heads provided with pawls to engage the ratchet and with which said rod is connected, brake-mechanism comprising a cam, a housing supported to be rotated about the cam, a yoke-device carrying a roller held in engagement with the cam and a brake-shoe supported on the yoke-device to be engaged frictionally with the housing, a link-connection between the yoke-device and said heads, and a train of gears actuated by rotating the shaft to rotate the housing against the brake-shoe.

6. In a shock-absorber, the combination of a casing, a rod for connection with a vehicle-axle to work up and down with movements thereof, a shaft journaled in the casing, carrying to rotate with it a ratchet and, loosely, a pair of heads containing slots and provided with pawls to engage the ratchet, a cross-head on the upper end of the rod working in said slots, brake-mechanism comprising a cam, a housing supported to be rotated about the cam, a yoke-device carrying a roller spring-held in engagement with the cam and a brake-shoe spring-supported on the yoke-device to be engaged frictionally with the housing, a link-connection between the yoke-device and said heads, and a train of gears actuated by rotating the shaft to rotate the housing against the brake-shoe.

7. A shock-absorber comprising, in combination, a casing, a shaft journaled in the casing carrying a ratchet and, loosely, a pair of heads containing slots and provided with pawls to engage the ratchet, a rod for connection with a vehicle-axle to work up and down with movements thereof, and provided on its upper end with a cross-head working in the head-slots, a gear-wheel secured on the shaft to rotate with it, a stationary shaft in the casing provided with a cam-faced collar, a housing supported on the stationary shaft to be rotated about said collar and carrying a pinion, a train of gears connecting said pinion and wheel, connected yoke-members on said collar carrying a roller spring-held against the cam-face, a brake-shoe spring supported on the connected yoke-members to be engaged frictionally with the housing, one of said members having a stem, and a link connecting said heads with said stem.

DAVID C. SHAW.
JAMES F. McGILLIVRAY.

In presence of—
N. B. DEARBORN,
A. C. FISCHER.

Copies of this patent may be obtained for five cents each, by addressing the "Commissioner of Patents, Washington, D. C."